No. 700,668. Patented May 20, 1902.
C. PATE.
FRUIT JUICE EXTRACTOR.
(Application filed Feb. 13, 1902.)
(No Model.)
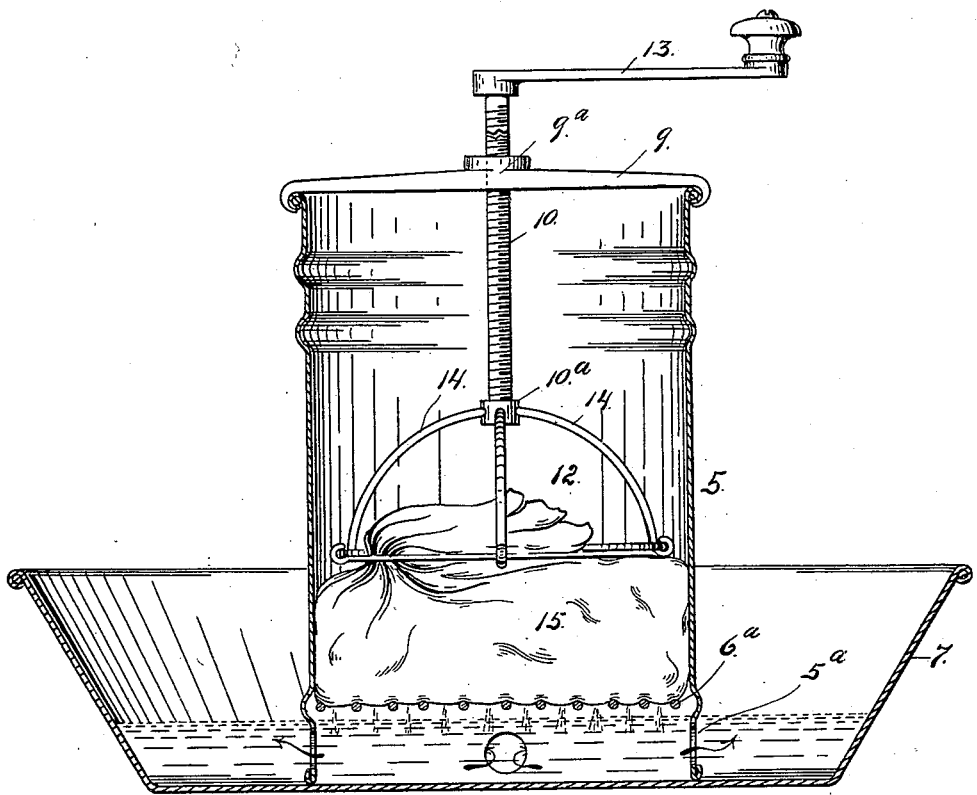
Fig. 1.
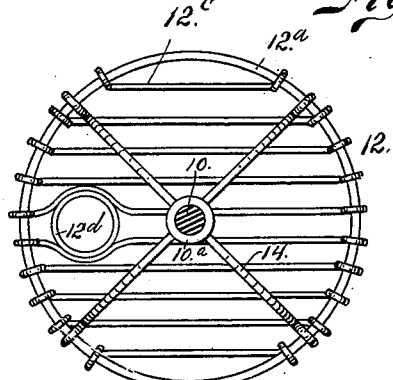
Fig. 2
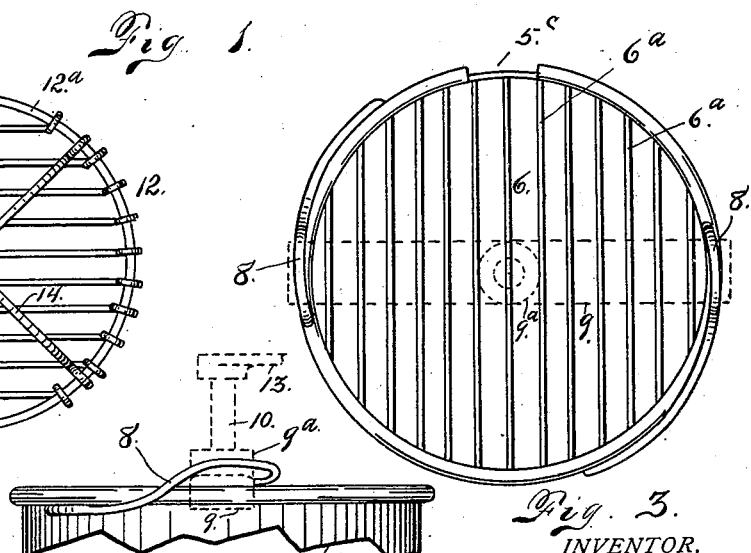
Fig. 4.
Fig. 3.
WITNESSES:
Otto E. Hoddick
Dena Nelson.
INVENTOR.
Clara Pate.
BY
ATTORNEY.

UNITED STATES PATENT OFFICE.

CLARA PATE, OF DENVER, COLORADO.

FRUIT-JUICE EXTRACTOR.

SPECIFICATION forming part of Letters Patent No. 700,668, dated May 20, 1902.

Application filed February 13, 1902. Serial No. 93,929. (No model.)

*To all whom it may concern:*

Be it known that I, CLARA PATE, a citizen of the United States of America, residing at Denver, in the county of Arapahoe and State of Colorado, have invented certain new and useful Improvements in Fruit-Juice Extractors; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in means more especially intended for removing the juice from fruit for jelly-making purposes. The device may, however, be employed in many other relations.

My object is to provide a device of this class which shall be simple in construction, economical in cost, reliable, durable, and efficient in use; and to these ends the invention consists of the features, arrangements, and combinations hereinafter described and claimed, all of which will be fully understood by reference to the accompanying drawings, in which is illustrated an embodiment thereof.

In the drawings, Figure 1 is a vertical section taken through my improved device shown in connection with a pan or receptacle for receiving the juices as they are pressed from the fruit. Fig. 2 is a plan view of the plunger shown in detail, its screw-stem being shown in cross-section. Fig. 3 is a top or plan view of the body of the device, the plunger being removed. In this view the position of the plunger-stem and the cross-bar in which the stem is threaded is indicated by dotted lines. Fig. 4 is a fragmentary side elevation of the same.

The same reference characters indicate the same parts in all the views.

Let the numeral 5 designate the body of the device, whose wall is preferably circular in horizontal section. At a suitable distance above the bottom or lower edge of this wall a bottom 6 is formed of such character as to allow the juices of the fruit to pass through. As shown in the drawings, this bottom is composed of parallel wires $6^a$, suitably separated for the purpose. While this construction is deemed preferable, it must be understood that other constructions adapted to perform the same or a similar function may be employed. Below this bottom the wall of the part 5 is provided with openings $5^a$ to allow the juices pressed through the bottom to escape into a suitable receptacle 7. The upper edge of the part 5 is beaded and provided with two springs 8, diametrically located and adapted to receive the extremities of a cross-piece 9 and hold the latter securely in place. The center $9^a$ of this cross-piece, which is reinforced for the purpose, is provided with a threaded opening. Its extremities are hook-shaped to engage the bead of the upper edge of the part 5, whereby the cross-piece is retained in operative position thereon. The bead is cut away, as shown at $5^c$, to permit the removal of the cross-piece when desired.

Threaded in the opening in the center of the cross-piece is a screw-stem 10, whose lower extremity is connected with a plunger 12 and whose opposite extremity is provided with a hand-crank 13. This plunger, as shown in the drawings, is of circular shape, its base consisting of an outer wire $12^a$, connected by parallel separated wires $12^c$. To the lower extremity of the stem 10 is made fast a hub $10^a$, which is supported by four downwardly-curved arms 14, connected with the hub at one extremity and with the wire 12 at the other extremity. The base of the plunger is provided with a ring $12^d$, which, as shown, is of greater diameter than the space between the parallel wires $12^c$. Hence two of these wires are spread apart sufficiently to receive the ring, which is secured thereto by soldering or in any other suitable manner.

When the device is in use, a sack or bag 15, composed of some suitable material to allow the fruit-juices to pass therethrough under pressure, is employed. This sack or bag contains the fruit from which the juices are to be extracted, and its mouth is drawn through the ring $12^d$ of the plunger, the latter having been first removed from the body part 5 by manipulating the cross-piece in a manner that will be readily understood. When the mouth of the sack is drawn through the ring, the portion of the sack containing the fruit is below the base of the plunger and the mouth is sufficiently closed by the ring for all practical purposes. The plunger, with the sack attached, is then placed in the receptacle 5 and the cross-piece 9 is turned until its extremities are engaged and held by the springs 3. The plunger is then rotated and forced downwardly simultaneously by turning the crank 13. This action subjects the fruit in the sack to such compression between the descending plunger and the bottom 6 of the part 5 that the juices are entirely removed from the fruit and pass thence through the fabric of the sack downwardly through the base of the plunger and the bottom 6 of the part 5 and thence out into the receptacle 7.

Having thus described my invention, what I claim is—

1. In a device for extracting fruit-juice, the combination with a receptacle having a bottom provided with openings to allow the juice of the fruit to pass through, a cross-piece mounted on top of the receptacle and provided with a threaded opening, a plunger adapted to enter the receptacle and provided with an opening in its base through which the mouth of the sack or bag containing the fruit, may be drawn, and adapted to close said mouth, and a screw-stem connected with the plunger and threaded in the cross-piece at the top of the receptacle, substantially as described.

2. In a fruit-juice extractor, the combination with a receptacle having a bottom provided with openings, said bottom being raised above the lower bottom edge of the side walls of the receptacle, a cross-piece movably mounted on top of the receptacle and having a threaded opening, retaining devices mounted on the receptacle to receive the cross-piece extremities, a screw-stem threaded in the cross-piece, and a plunger made fast to said stem, the plunger having an opening to receive the mouth of the sack containing the fruit, and constructed to close said mouth during the fruit-extracting operation, substantially as described.

3. In a device of the class described, the combination with a receptacle having a bottom composed of parallel wires raised above the lower edge of the side wall, which is provided with openings beneath the said bottom, a plunger adapted to enter said receptacle, the plunger having an opening adapted to receive and close the mouth of a sack, a screw-stem attached to the plunger, and a cross-piece mounted on the receptacle, in which cross-piece the screw-stem is threaded, substantially as described.

4. In a fruit-extractor, the combination with a receptacle having a bottom opening to allow juice to pass through, a plunger adapted to enter the receptacle, having parallel cross wires or pieces, and an opening to receive the mouth of the sack containing the fruit, a screw-stem attached to said plunger, and a cross piece or bar mounted on the upper edge of the receptacle, in which cross-piece the screw-stem is threaded.

5. The combination of a receptacle having a bottom provided with openings, a plunger adapted to enter said receptacle, and composed of a base, a hub and upwardly-projecting arms connecting the base and hub; a screw-stem attached to the hub, and a cross-piece mounted on top of the receptacle and in which piece the screw-stem is threaded.

6. In a fruit-juice-extracting device, the combination of a receptacle having a bottom opening to allow the fruit-juice to pass through, a plunger located in said receptacle above said bottom, a screw-stem attached to the plunger, a cross-piece mounted on top of the receptacle whose upper edges are beaded, the cross-piece having hooks engaging said bead, and provided with a threaded opening through which the screw-stem passes, and springs located on opposite sides of the top of the receptacle and adapted to receive the cross-piece extremities and retain the said piece in place, the bead at the top of the receptacle being cut away to permit the removal of the cross-piece, substantially as described.

7. In a fruit-juice extractor, the combination of a receptacle, having a bottom composed of parallel wires, a plunger located in said receptacle above the bottom and composed of an outer ring connected by parallel cross-wires, a small ring inserted between the cross-wires, a hub located above the cross-wires, and curved arms connecting the outer ring and the hub; a screw-stem attached to the hub, a cross-piece mounted on top of the receptacle, in which piece the screw-stem is threaded, and a crank attached to the upper extremity of said stem, substantially as described.

In testimony whereof I affix my signature in presence of two witnesses.

CLARA PATE.

Witnesses:
DENA NELSON,
A. J. O'BRIEN.